United States Patent
Schroeder

(10) Patent No.: US 7,278,312 B2
(45) Date of Patent: *Oct. 9, 2007

(54) METHOD FOR ELECTRONIC TUNING OF THE READ OSCILLATION FREQUENCY OF A CORIOLIS GYRO

(75) Inventor: Werner Schroeder, Ettenheim (DE)

(73) Assignee: LITEF GmbH, Freiburg (DE)

( * ) Notice: Subject to any disclaimer, the term of this patent is extended or adjusted under 35 U.S.C. 154(b) by 104 days.

This patent is subject to a terminal disclaimer.

(21) Appl. No.: 10/531,814

(22) PCT Filed: Oct. 7, 2003

(86) PCT No.: PCT/EP03/11090

§ 371 (c)(1), (2), (4) Date: Apr. 18, 2005

(87) PCT Pub. No.: WO2004/038333

PCT Pub. Date: May 6, 2004

(65) Prior Publication Data

US 2006/0101910 A1    May 18, 2006

(30) Foreign Application Priority Data

Oct. 18, 2002  (DE) ................. 102 48 735

(51) Int. Cl.
G01P 3/44         (2006.01)
G01P 21/00        (2006.01)

(52) U.S. Cl. ..................... 73/504.12; 73/1.37

(58) Field of Classification Search ............ 73/504.02, 73/504.04, 504.12, 504.13, 504.14, 504.15, 73/504.16, 1.37, 1.38

See application file for complete search history.

(56) References Cited

U.S. PATENT DOCUMENTS

| | | | | |
|---|---|---|---|---|
| 5,847,279 A | * | 12/1998 | Piazza | 73/504.16 |
| 6,089,089 A | * | 7/2000 | Hsu | 73/504.12 |
| 6,250,156 B1 | * | 6/2001 | Seshia et al. | 73/504.12 |
| 6,296,779 B1 | * | 10/2001 | Clark et al. | 216/66 |
| 2006/0010999 A1 | * | 1/2006 | Schroeder | 74/5.4 |
| 2006/0020409 A1 | * | 1/2006 | Schroeder | 702/106 |

FOREIGN PATENT DOCUMENTS

| | | |
|---|---|---|
| DE | 4447005 | 7/1996 |
| DE | 69615468 | 1/1997 |
| DE | 69711823 | 6/1998 |
| DE | 19910415 | 9/2000 |
| DE | 19939998 | 3/2001 |
| DE | 10062347 | 6/2002 |
| WO | 9745699 | 12/1997 |
| WO | 9919734 | 4/1999 |

* cited by examiner

*Primary Examiner*—Helen Kwok
(74) *Attorney, Agent, or Firm*—Elliott N. Kramsky

(57) ABSTRACT

In a method for electronic tuning of the frequency of the read oscillation to the frequency of the stimulation oscillation in a Coriolis gyro the resonator of the Coriolis gyro has a disturbance force applied to it such that the stimulation oscillation remains essentially uninfluenced. The read oscillation is changed so that a read signal that represents the read oscillation contains a corresponding disturbance component. The disturbance force is defined as the force caused by the signal noise in the read signal. The frequency of the read oscillation is controlled so that the strength of the disturbance component contained in the read signal is a minimum.

8 Claims, 2 Drawing Sheets

METHOD FOR ELECTRONIC TUNING OF THE READ OSCILLATION FREQUENCY OF A CORIOLIS GYRO

BACKGROUND

1. Field of the Invention

The present invention relates to Coriolis gyros. More particularly, this invention pertains to a method for electronic tuning of read oscillation frequency to stimulation oscillation frequency in such a device.

2. Description of the Prior Art

Coriolis gyros (also known as "vibration gyros") are increasingly employed for navigation. Such devices include a mass system that is caused to oscillate. Such oscillation is generally a superimposition of a large number of individual oscillations. The individual oscillations of the mass system are initially independent of one another and each may be regarded in the abstract as a "resonator". At least two resonators are required for operation of a vibration gyro. A first resonator is artificially stimulated to oscillate, with such oscillations referred to below as a "stimulation oscillation". A second resonator is stimulated to oscillate only when the vibration gyro is moved or rotated. That is, Coriolis forces occur which couple the first resonator to the second resonator, draw energy from the stimulation oscillation of the first resonator, and transfer the energy to the read oscillation of the second resonator. The oscillation of the second resonator is referred to below as the "read oscillation". In order to determine movement (in particular rotation) of the Coriolis gyro, the read oscillation is tapped off and a corresponding read signal (e.g. the tapped-off read oscillation signal) is analyzed to determine whether any changes occurred in the amplitude of the read oscillation that measures rotation of the Coriolis gyro. Coriolis gyros may be in the form of either an open loop or a closed loop system. In a closed loop system, the amplitude of the read oscillation is continuously reset to a fixed value (preferably zero) by control loops.

FIG. 2 is a schematic diagram of a closed loop Coriolis gyro 1. The gyro 1 has a mass system 2 that can be caused to oscillate and is referred to below as a resonator 2 (in contrast to the "abstract" resonators, mentioned above, which represent individual oscillations of the "real" resonator). As already mentioned, the resonator 2 may be regarded as a system composed of two "resonators" (a first resonator 3 and a second resonator 4). Each of the first and second resonators 3, 4 is coupled to a force transmitter (not shown) and to a tapping-off system (not shown). Noise produced by the force transmitter and the tapping-off system is indicated schematically by noise 1 (reference symbol 5) and noise 2 (reference symbol 6).

The Coriolis gyro 1 includes four control loops. A first control loop is employed for controlling the stimulation oscillation (i.e. the frequency of the first resonator 3) at a fixed frequency (resonant frequency). The first control loop has a first demodulator 7, a first low-pass filter 8, a frequency regulator 9, a VCO (voltage controlled oscillator) 10 and a first modulator 11. A second control loop controls the stimulation oscillation at a constant amplitude and includes a second demodulator 12, a second low-pass filter 13 and an amplitude regulator 14.

Third and fourth control loops are used for resetting forces that stimulate the read oscillation. The third control loop includes a third demodulator 15, a third low-pass filter 16, a quadrature regulator 17 and a second modulator 18. The fourth control loop comprises a fourth demodulator 19, a fourth low-pass filter 20, a rotation rate regulator 21 and a third modulator 22.

The first resonator 3 is stimulated at its resonant frequency $\omega_1$. The resultant stimulation oscillation is tapped off, demodulated in phase by means of the first demodulator 7, and a demodulated signal component passed to the first low-pass filter 8 that removes the sum frequencies. The tapped-off signal is referred to below as the tapped-off stimulation oscillation signal. An output from the first low-pass filter 8 is supplied to a frequency regulator 9 that controls the VCO 10 as a function of the applied signal so that the in-phase component essentially tends to zero. For this, the VCO 10 sends a signal to the first modulator 11, which controls a force transmitter so that a stimulation force is applied to the first resonator 3. When the in-phase component is zero, the first resonator 3 oscillates at its resonant frequency $\omega_1$. It should be mentioned that all of the modulators and demodulators are operated on the basis of resonant frequency $\omega_1$.

The tapped-off stimulation oscillation signal is also passed to the second control loop and demodulated by the second demodulator 12. The output of the second demodulator 12 is passed through the second low-pass filter 13, whose output signal is, in turn, applied to the amplitude regulator 14. The amplitude regulator 14 controls the first modulator 11 as a function of such signal and of a nominal amplitude transmitter 23 such that the first resonator 3 oscillates at a constant amplitude (i.e. the stimulation oscillation has constant amplitude).

As has already been mentioned, movement or rotation of the Coriolis gyro 1 results in Coriolis forces (indicated by the FC·cos($\omega_1$·t) in the drawing) that couple the first resonator 3 to the second resonator 4, causing the second resonator 4 to oscillate. A resultant read oscillation at frequency $\omega_2$ is tapped off so that a corresponding tapped-off read oscillation signal (read signal) is supplied to both the third and fourth control loops. In the third control loop, this signal is demodulated by means of the third demodulator 15, the sum frequencies removed by the third low-pass filter 16, and the low-pass-filtered signal supplied to quadrature regulator 17 whose output is applied to the third modulator 22 so that corresponding quadrature components of the read oscillation are reset. Analogously, the tapped-off read oscillation signal is demodulated in the fourth control loop by means of a fourth demodulator 19. It then passes through a fourth low-pass filter 20 and the filtered signal is applied to a rotation rate regulator 21. The output of the rotation rate regulator 21 is proportional to the instantaneous rotation rate and is passed as the rotation rate measurement to a rotation rate output 24 and to the second modulator 18, which resets the corresponding rotation rate components of the read oscillation.

A Coriolis gyro 1 as described above can be operated in either a double-resonant form or in a form in which it is not double-resonant. When the Coriolis gyro 1 is operated in a double-resonant form, the frequency of $\omega_2$ of the read oscillation is approximately equal to the frequency $\omega_1$ of the stimulation oscillation. In contrast, when it is operated in a form in which it is not double-resonant, the frequency $\omega_2$ of the read oscillation differs from the frequency $\omega_1$ of the stimulation oscillation. In the case of double-resonance, the output signal from the fourth low-pass filter 20 contains information about the rotation rate, while, when it is not operated in double-resonant form, the output signal from the third low-pass filter 16 contains the rotation rate information. A doubling switch 25 which selectively connects the outputs of the third and fourth low-pass filters 16, 20 to the rotation rate regulator 21 and to the quadrature regulator 17 is provided for switching between the double-resonant and non-double resonant modes.

When the Coriolis gyro 1 is operated in a double-resonant form, the frequency of the read oscillation is tuned, as mentioned, to that of the stimulation oscillation. This may be done to the resonator 2, for example by mechanical means, in which material is removed from the mass system. As an alternative, the frequency of the read oscillation can be set by means of an electrical field in which the resonator 2 is mounted to oscillate (i.e., by changing the electrical field strength). It is thus possible to tune the frequency of the read oscillation to the frequency of the stimulated oscillation electronically during operation of the Coriolis gyro 1.

SUMMARY AND OBJECTS OF THE INVENTION

It is an object of the invention to provide a method for electronically tuning the frequency of the read oscillation in a Coriolis gyro to that of the stimulation oscillation.

The preceding and other objects are addressed by the present invention which provides, in a first aspect, a method for electronic tuning of the frequency of the read oscillation to the frequency of the stimulation oscillation in a resetting Coriolis gyro.

A disturbance force is applied to the resonator of the gyro so that the stimulation oscillation remains essentially uninfluenced. The read oscillation is changed so that a read signal that represents the read oscillation contains a corresponding disturbance component defined as the force caused by the signal in the read signal. The frequency of the read oscillation is controlled so that the magnitude of the disturbance component contained in the read signal is as small as possible.

In a second aspect, the invention provides a Coriolis gyro. The gyro is characterized by a device for electronic tuning of the frequency of the read oscillation to the frequency of the stimulation oscillation.

Such device includes a noise detection unit that determines the noise component of a read signal that represents the read oscillation. A control unit is provided that controls the frequency of the read oscillation so that the magnitude of the noise component contained in the read signal is as small as possible.

The preceding and other features of the invention will become further apparent from the detailed description that follows. Such description is accompanied by a set of drawings. Numerals of the drawings, corresponding to those of the written description, point to the features of the invention with like numerals referring to like features throughout.

DETAILED DESCRIPTION OF THE PREFERRED EMBODIMENT

Figure 1:
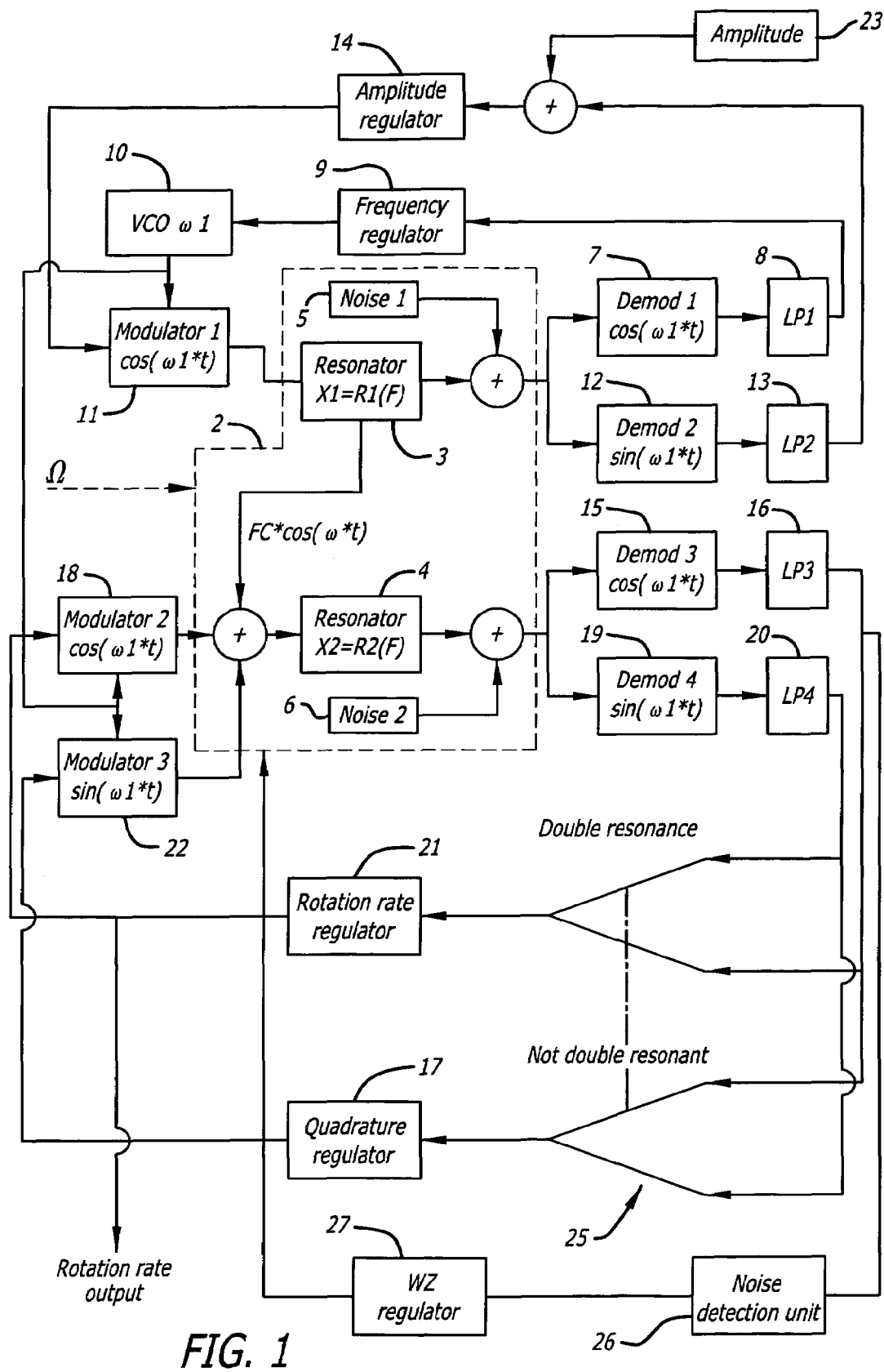
FIG. 1 is a schematic diagram of a Coriolis gyro based on the method of the invention.
Figure 2:
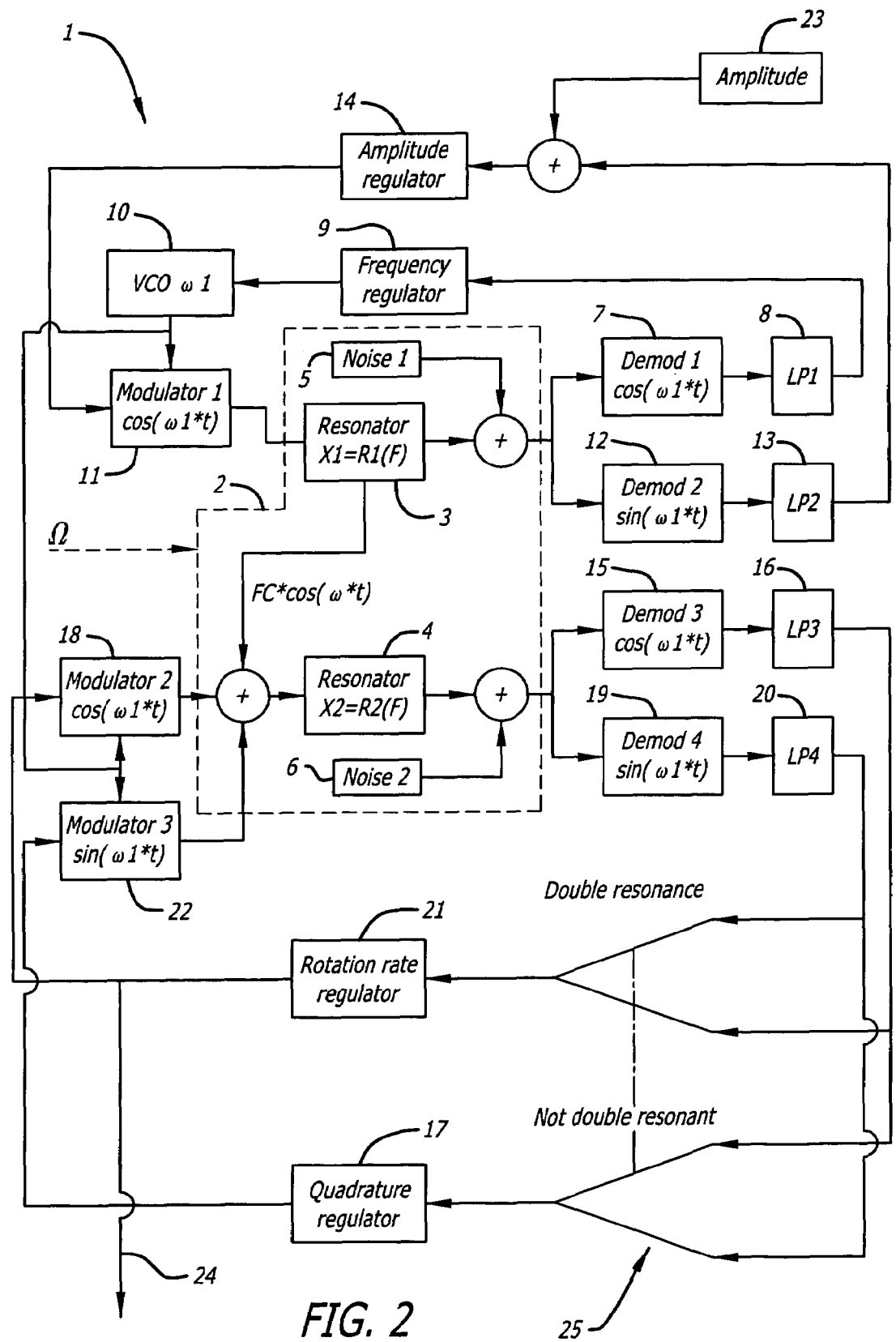
FIG. 2 is a schematic diagram of a Coriolis gyro in accordance with the prior art.

FIG. 1 is a schematic diagram of a Coriolis gyro 1' based on the method of the invention. Parts and/or devices that correspond to those of FIG. 2 are identified by the same reference symbols. The Coriolis gyro 1' is additionally provided with a noise detection unit 26 and a read oscillation frequency regulator 27.

Signal noise (inherent noise) of the read oscillation tapping electronics (indicated by the reference numeral 6) produces a disturbance signal in the tapped-off read oscillation signal (read signal) which is supplied to the two control loops (quadrature control loop and rotation rate control loop). After passing through the control loops, the disturbance signal is applied to second and third modulators 18, 22. The outputs of the modulators are applied to a force transmitter (not shown) and, thus, to the resonator 2. Should the frequency of the read oscillation not essentially match that of the stimulation oscillation, the disturbance signal is observed, after "passing through" the resonator 2, in the form of a disturbance component of the tapped-off read oscillation signal.

The disturbance signal (inherent noise) is then determined by the noise detection unit 26. The tapped-off read oscillation signal or a signal applied to or emitted from the quadrature regulator 17/rotation rate regulator 21 (as illustrate, a signal which is applied to the quadrature regulator 17) is tapped off and the noise component extracted. The disturbance component is thus determined.

An output signal from the noise detection unit 26 is supplied to the read oscillation frequency regulator 27i that sets the frequency of the read oscillation as a function of it. Thus, the output signal from the noise detection unit 26 (i.e. the strength of the observed disturbance component) is a minimum. When a minimum such as this has been reached, the frequencies of the stimulation oscillation and the read oscillation are essentially identical.

In a second, alternative method for electronic tuning the frequency of the read oscillation to that of the stimulation oscillation in a Coriolis gyro, a disturbance force is applied to the resonator of the Coriolis gyro so that (a) the stimulation oscillation remains essentially uninfluenced, and (b) the read oscillation is changed such that a read signal which represents the read oscillation contains a corresponding disturbance component. In this way, the frequency of the read oscillation is controlled so that the magnitude of the disturbance component contained in the read signal is as small as possible.

A major discovery on which the second alternative method is based is that an artificial change to the read oscillation in the rotation rate channel or quadrature channel is visible to a greater extent, in particular in the respective channel which is orthogonal to it, the less the frequency of the read oscillation matches the frequency of the stimulation oscillation. The "penetration strength" of a disturbance such as this to the tapped-off read oscillation signal (in particular to the orthogonal channel) is thus a measure of how accurately the frequency of the read oscillation is matched to the frequency of the stimulation oscillation. Thus, if the frequency of the read oscillation is controlled so that the penetration strength assumes a minimum (i.e., such that the magnitude of the disturbance component which is contained in the tapped-off read oscillation signal is a minimum) then the frequency of the read oscillation is at the same time essentially matched to the frequency of the stimulation oscillation.

In a third alternative embodiment of the method for electronic tuning of the frequency of the read oscillation to that of the stimulation oscillation in a Coriolis gyro, a disturbance force is applied to the resonator of the Coriolis gyro such that (a) the stimulation oscillation remains essentially uninfluenced and (b) the read oscillation is changed so that a read signal representing the read oscillation contains a corresponding disturbance component. The frequency of the read oscillation is controlled so that any phase shift between a disturbance signal, which produces the disturbance force, and the disturbance component contained in the read signal is a small as possible.

In this case, "resonator" refers to the entire mass system (or part of it) that can be caused to oscillate in the Coriolis gyro (i.e., that part of the Coriolis gyro that is annotated with reference numeral 2).

A significant discovery on which the third method is based is that the "time for disturbance to pass through" an artificial change to the read oscillation resulting from the application of appropriate disturbance forces to the resonator (i.e. the time which passes from the effect of the disturbance on the resonator until the disturbance is tapped off as part of the read signal) is dependent upon the frequency of the read oscillation. The shift between the phase of the component signal contained in the read signal and the phase of the disturbance component signal contained in the read signal is thus a measure of the frequency of the read oscillation. It can be shown that the phase shift assumes a minimum when the frequency of the read oscillation essentially matches the frequency of the stimulation oscillation. If the frequency of the read oscillation is thus controlled so that the phase shift assumes a minimum, the frequency of the read oscillation is at the same time essentially matched to that of the stimulation oscillation.

The first method described for electronic tuning of the read oscillation frequency can be combined as required with the second method and/or with the third method. For example, it is possible to use the second alternative method while the Coriolis gyro is being started up (rapid transient response), and then to use the method described first (slow control process) in steady-state operation.

"Resonator" in this case refers to the entire mass system that can be caused to oscillate in the Coriolis gyro (i.e., that part of the Coriolis gyro which is identified by the reference number 2). The essential feature in this case is that the disturbance forces on the resonator change only the read oscillation, but not the stimulation oscillation. With reference to FIG. 2, this would mean that the disturbance forces act only on the second resonator 4, but not the first resonator 3.

A significant discovery on which the invention is based is that a disturbance signal, in the form of signal noise, which occurs directly in the tapped-off read oscillation signal or at the input of the control loops (rotation rate control loop/quadrature control loop), can be observed to a greater extent in the tapped-off read oscillation signal after "passing through" the control loops and the resonator, the less the frequency of the read oscillation matches the frequency of the stimulation oscillation. The signal noise (the signal noise of the read oscillation tapping-off electronics or the random walk of the Coriolis gyro) is applied, after "passing through" the control loops, to the force transmitters and thus produces corresponding disturbance forces that are applied to the resonator and, thus, cause an artificial change in the read oscillation. The "penetration strength" of a disturbance such as this to the tapped-off read oscillation signal is thus a measure of how accurately the frequency of the read oscillation is matched to that of the stimulation oscillation. Thus, if the frequency of the read oscillation is controlled so that the penetration strength assumes a minimum, (i.e., the magnitude of the disturbance component which is contained in the tapped-off read oscillation signal, that is the noise component) then the frequency of the read oscillation is at the same time matched to the frequency of the stimulation oscillation.

As already mentioned, the disturbance signal results from low-frequency rotation rate noise on the tapped-off read oscillation signal and from random walk of the added-up rotation rate angle. The disturbance signal is thus not produced artificially, and already-existing disturbance signals (noise from the read oscillation tapping-off electronics) are used instead. It can be shown that low-frequency rotation rate noise (random walk of the integrated angle in the case of Coriolis gyros that are operated with double resonance, i.e., when the frequencies of the stimulation oscillation and read oscillation match) is several orders of magnitude less than for Coriolis gyros without double resonance. Detailed analysis shows that the reduction factor after a minimum time, which is dependent on the Q-factor of the read oscillation, is half of the value of the Q-factor of this oscillation.

It is advantageous that the disturbance is itself produced by the self-noise of the Coriolis gyro. No artificial disturbances/modulations are required. A further advantage is that the random walk of the Coriolis gyro can be measured at the same time during the frequency matching between the stimulation oscillation and read oscillation. In this case, it is advantageous to observe the passage of the disturbance through the quadrature control loop since no low-frequency noise resulting from the variation of the rotation speed occurs in this, as opposed to the rotation rate control loop. It is a disadvantage that, when using the quadrature control loop, the process for tuning the frequency of the stimulation oscillation to that of the read oscillation takes a relatively long time. The disturbance component (noise component) is therefore preferably determined from a signal applied to, or emitted from, a quadrature regulator in the quadrature control loop. Alternatively, the disturbance component can be determined from a signal applied to, or emitted from, a rotation rate regulator in the rotation rate control loop.

The frequency of the read oscillation (i.e. the force transmission of the control forces which are required for frequency control) is in this case controlled by controlling the intensity of an electrical field in which at least a part of the resonator oscillates, with an electrical attraction force. Such force, preferably non-linear, is established between the resonator and an opposing piece, fixed to the frame and surrounding.

While the invention has been described with reference to its presently-preferred embodiment, it is not limited thereto. Rather, the invention is limited only insofar as it is defined by the following set of patent claims and includes within its scope all equivalents thereof.

What is claimed is:

1. A method for electronic tuning of a frequency of a read oscillation to the frequency of a stimulation oscillation in a resetting Coriolis gyro, wherein a resonator of the Coriolis gyro has a disturbance force applied to said resonator such that a) the stimulation oscillation remains essentially uninfluenced, and b) the read oscillation is changed such that a read signal which represents the read oscillation, contains a corresponding disturbance component, wherein the disturbance force is defined as that force which is caused by a signal noise in the read signal, and the frequency of the read oscillation is controlled such that a magnitude of the disturbance component, which is contained in the read signal, is as small as possible.

2. The method as claimed in claim 1, characterized in that the signal noise is a noise of a tapping electronics.

3. The method as claimed in claim 1, characterized in that the disturbance component is determined from a signal which is applied to a quadrature regulator in a quadrature control loop, or is emitted from said quadrature regulator.

4. The method as claimed in claim 1 characterized in that the disturbance component is determined from a signal which is applied to a rotation rate regulator in a rotation rate control loop, or is emitted from said rotation rate regulator.

5. The method as claimed in claim 1, characterized in that the frequency of the read oscillation is controlled by controlling an intensity of an electrical field in which a part of the resonator of the Coriolis gyro oscillates.

6. A Coriolis gyro, characterized by a device for electronic tuning of a frequency of a read oscillation to a frequency of a stimulation oscillation, having:

a noise detection unit which determines a noise component of a read signal which represents the read oscillation, and a control unit, which controls the frequency of the read oscillation such that a magnitude of the noise component, which is contained in the read signal, is as small as possible.

7. The Coriolis gyro as claimed in claim 6, characterized in that the noise detection unit determines the noise component from a signal which is applied to a rotation rate regulator in a rotation rate control loop in the Coriolis gyro, or is emitted from said rotation rate regulator.

8. The Coriolis gyro as claimed in claim 6, characterized in that the noise detection unit determines the noise component from a signal which is applied to a quadrature regulator in a quadrature control loop in the Coriolis gyro, or is emitted from said quadrature regulator.

* * * * *